United States Patent [19]

Hassler et al.

[11] Patent Number: 5,566,423
[45] Date of Patent: Oct. 22, 1996

[54] DELAY MECHANISM FOR RETARDING RELATIVE MOVEMENT BETWEEN TWO MEMBERS

[75] Inventors: Stephen P. Hassler, Muskego, Wis.; Stephen P. Johnson, Olean, N.Y.; John Lapp, Franklin, Wis.

[73] Assignee: Cooper Industries, Inc., Houston, Tex.

[21] Appl. No.: 174,940

[22] Filed: Dec. 27, 1993

Related U.S. Application Data

[63] Continuation-in-part of Ser. No. 946,961, Sep. 17, 1992, Pat. No. 5,274,349, Ser. No. 67,512, May 24, 1993, and Ser. No. 65,439, May 24, 1993, Pat. No. 5,355,111.

[51] Int. Cl.⁶ ........................................... E05D 11/10
[52] U.S. Cl. .......................................................... 16/319
[58] Field of Search ............................... 16/82, 221, 319, 16/337, 342, 51, 54, 68, 49, 65, 80; 74/574

[56] References Cited

U.S. PATENT DOCUMENTS

| | | | |
|---|---|---|---|
| 3,118,167 | 1/1964 | Morris et al. | 16/82 |
| 3,913,050 | 10/1975 | Mikulecky | 337/159 |
| 3,994,096 | 11/1976 | Holmgren et al. | 16/54 |
| 4,069,545 | 1/1978 | Holet et al. | 16/52 |
| 4,414,527 | 11/1983 | Biller | 337/180 |
| 4,506,249 | 3/1985 | Huber et al. | 337/232 |
| 4,570,146 | 2/1986 | Huber et al. | 337/158 |

FOREIGN PATENT DOCUMENTS

| | | | |
|---|---|---|---|
| 3148888 | 6/1983 | Germany | 16/52 |
| 3313220 | 10/1984 | Germany | 16/75 |
| 58-37341 | 3/1983 | Japan | 16/82 |

OTHER PUBLICATIONS

European Patent Application, Apr. 1989; No. 0311026.

*Primary Examiner*—M. Rachuba
*Assistant Examiner*—Donald M. Gurley
*Attorney, Agent, or Firm*—Conley, Rose & Tayon, P.C.

[57] ABSTRACT

An apparatus for retarding rotation of a pin member, comprising: a sleeve having a body and a chamber within the body, the sleeve body comprising first and second coaxial body segments, the first body segment including a reduced-diameter portion and the second body segment including a counterbore sized to receive the reduced-diameter portion, the reduced diameter portion being axially longer than the counterbore, such that a circumferential recess is formed when the reduced diameter portion is slidingly received in the counterbore;

a pair of aligned apertures in the body;

a shaft disposed through the apertures and adapted for rotation within the chamber;

viscous material surrounding the shaft and substantially filling the shaft and substantially filling the voids in the chamber;

and extensions on the shaft for engaging the viscous material and retarding rotation of the shaft in the chamber.

10 Claims, 7 Drawing Sheets

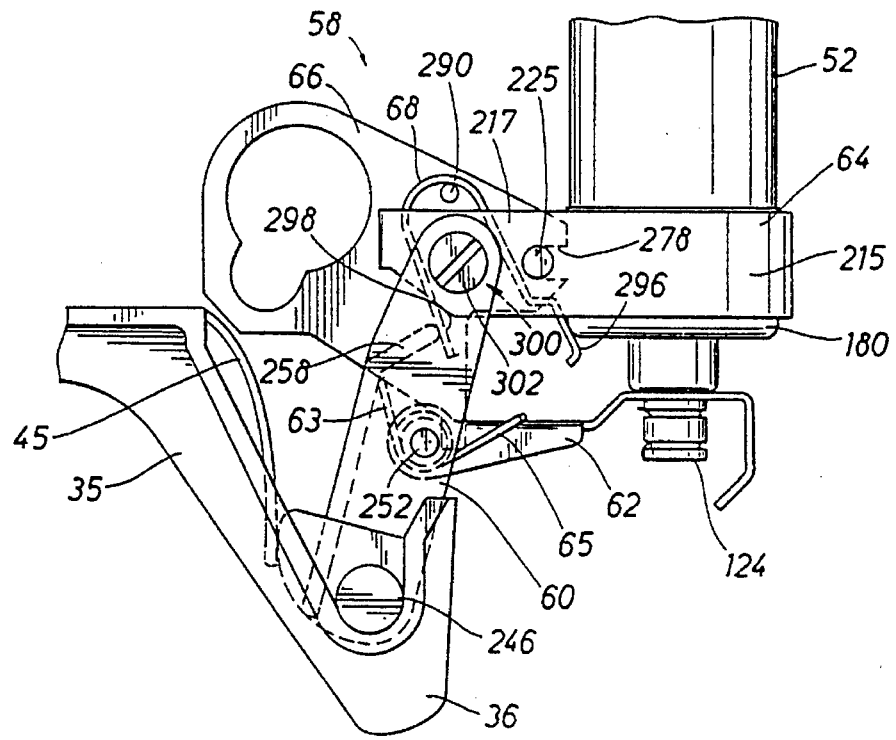
FIG. 3
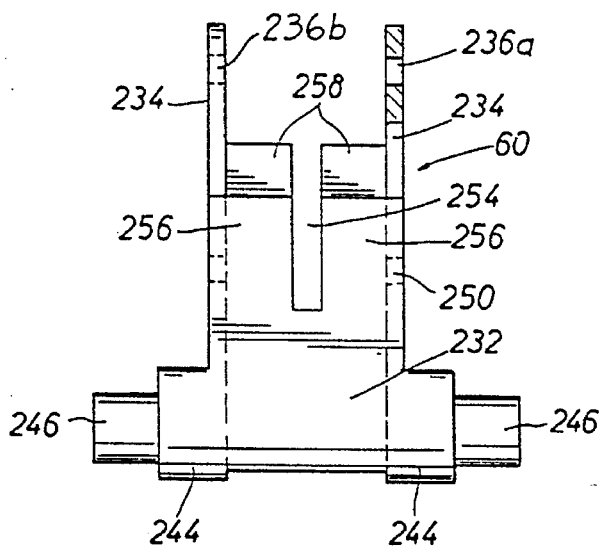
FIG. 6
FIG. 7

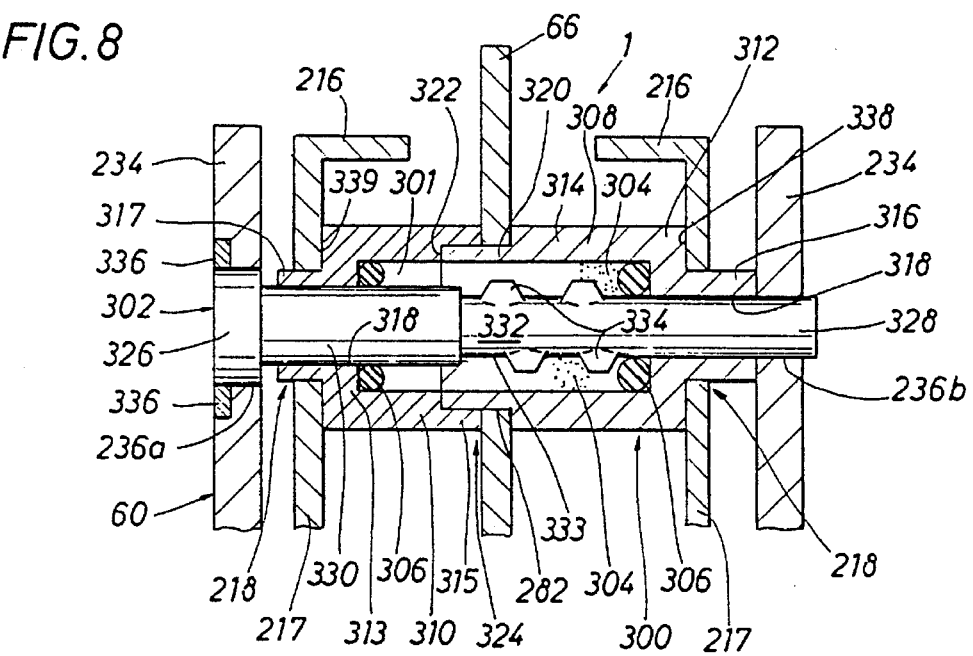
FIG. 8
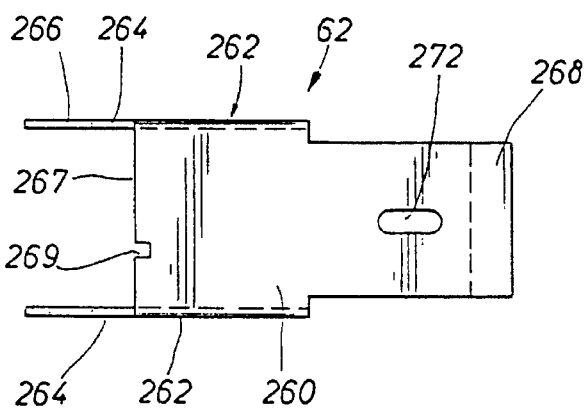
FIG. 10
FIG. 9
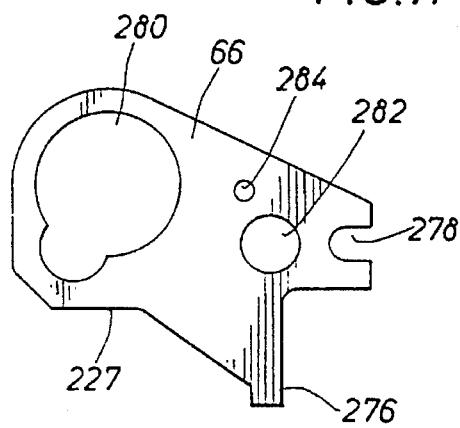
FIG. 11
FIG. 12

DELAY MECHANISM FOR RETARDING RELATIVE MOVEMENT BETWEEN TWO MEMBERS

This application is a continuation-in-part of the following U.S. patent applications: Ser. No. 07/946,961, filed Sep. 17, 1992 now U.S. Pat. No. 5,274,349; Ser. No. 08/067,512, filed May 24, 1993; and Ser. No. 08/065,439, filed May 24, 1993 now U.S. Pat. No. 5,355,111.

FIELD OF THE INVENTION

The present invention relates generally to electrical power distribution apparatus. More particularly, the invention relates to apparatus for disconnecting electrical components from an energized conductor. Still more particularly, the invention relates to apparatus for delaying or retarding a dropout fuseholder or other electrical component from dropping out of conducting engagement from live or energized conductors.

BACKGROUND OF THE INVENTION

Electrical transmission and distribution networks consist of a staggering number of transformers, capacitor banks, reactors, motors, generators and other major pieces of electrical equipment. Such equipment is extremely expensive. Further, each piece of such equipment typically plays a vital role in the distribution of power to end users, such that an outage caused by the equipment being damaged or taken out of service for repair or replacement, may have extremely costly consequences. As a result, such equipment is typically protected from potentially damaging overvoltages and overcurrents by protective components, such as fuses and surge arresters.

A fuse is a current interrupting device which protects a circuit by means of a current-responsive fusible element. When an overcurrent or short-circuit current of a predetermined magnitude and duration is conducted through the fuse, the fusible element melts, thereby opening the circuit. After having interrupted an overcurrent, the fuse must be located and replaced in order to restore service.

A type of fuse that is particularly desirable in today's power distribution networks is the current limiting fuse. The current-limiting fuse has at least three features that have made it extremely desirable for use by the utilities:

(1) Interruption of overcurrents is accomplished quickly and without the violent expulsion of flaming arc products or gases or the development of forces external to the fuse body, all of which are characteristic of expulsion type fuses. This enables the current-limiting fuse to be used indoors, or even in small enclosures. Furthermore, since there is no discharge of hot gases or flame, only normal electrical clearances from other apparatus need to be provided.

(2) A current-limiting action or reduction of current through the fuse to a value less than that otherwise available from the power-distribution network at the fuse location occurs if the overcurrent greatly exceeds the continuous-current rating of the fuse. Such a current reduction reduces the stresses and possible damage to the circuit up to the fault or to the faulted equipment itself, and also reduces the shock to the distribution network.

(3) Very high interrupting ratings are achieved by virtue of its current-limiting action so that current-limiting fuses can be applied on medium or high-voltage distribution circuits of very high available short-circuit currents.

A current limiting fuse typically consists of one or more fusible elements of silver wire or ribbon of a required length which are electrically connected at their ends to a pair of electrical terminations. The subassembly—consisting of the fusible element and end terminations—is placed in a tubular housing that is made of a highly temperature-resistant material, and the housing is then typically filled with high-purity silica sand and sealed. Terminals on the ends of the housing interconnect the fuse with the distribution network. The entire assembly is generally referred to as a current limiting fuse.

Another important consideration to utilities in fuse selection relates to the ability of the fuse to be physically integrated within the utilities' existing network, and the ease and cost of installation and service. In present-day networks, fuseholders are typically installed in mountings which are known as "cutouts." Generally speaking, a cutout consists of a mounting having an insulating support designed to be mounted on a utility pole or crossarm and having a pair of spaced-apart terminals which are designed to receive and electrically engage a fuseholder, a switch assembly, or a combination thereof. When installed, the fuseholder or switch bridges the "gate" between the terminals of the cutout mounting.

The term "fuse cutout" usually refers to the combination of a cutout mounting, as described above, with a fuseholder. The fuseholder that is most typically employed in a fuse cutout is designed to be easily disengaged from the terminals of the cutout to permit quick and convenient fuse removal and replacement.

Present day fuse cutouts offer a relatively convenient and low cost means of fusing, and thereby protecting electrical distribution systems. Further, the industry is adopting a dimensional standard for expulsion fuseholders and cutout mountings, such that an expulsion fuseholder from one manufacturer will properly fit into the mounting of another manufacture. Further, these "interchangeable" cutouts are widely distributed throughout electrical distribution systems in this country, and large numbers of these cutouts are presently in service.

As mentioned earlier, after a fuse has operated to clear a fault, it must physically be replaced. This requires that utility personnel first locate which fuse or fuses have operated. Because of the complexities of modern networks, this is frequently a time consuming process, and is particularly difficult during adverse weather conditions.

Because of the need for a quick and simple means for detecting which fuses have operated, a particularly convenient and desirable fusing device known as the "dropout" fuseholder was created. A dropout fuseholder not only serves the primary function of protecting costly equipment from potentially damaging fault currents, but it also functions to provide a clear visual indication that the fuse has operated as an aid to utility personnel searching for a cause for an outage.

The dropout fuseholder typically includes a pair of terminals for connecting the fuseholder into a cutout mounting that is installed in the circuit that is to be protected, and an actuation means for causing the fuseholder to physically drop out of engagement with one terminal of the cutout mounting after the fuse has operated. The dropout fuseholder is designed such that, upon actuation of the fuse, one end of the fuseholder becomes disengaged from the cutout mounting. When this occurs, the unrestrained end of the fuseholder rotates down and away from its normal bridging position between the mounting gate, while the fuseholder remains supported from the mounting by its still-engaged end. The drop open feature provides the additional benefit of removing the fuseholder from the voltage stress otherwise associated with the energized conductor, eliminating the possibility of tracking and ultimate flash over around the fuse.

A typical prior art dropout fuseholder is disclosed in U.S. Pat. No. 3,611,240 (Mikulecky). As disclosed in that patent, upon actuation of the fuse, an explosive charge is ignited which actuates the dropout mechanism and frees the fuseholder to drop out of engagement with the cutout mounting in which it is installed. Similarly, U.S. Pat. No. 3,825,871 (Blewitt) also discloses a dropout fuseholder which employs an explosive charge to initiate dropout.

Although the drop open ability of the dropout fuseholder is a significant feature, the fuseholder must be carefully designed and applied to ensure that the fuse has sufficient time to clear the fault before dropout occurs. If the fuse has not operated to clear the fault by the time that dropout begins, an arc will be drawn between the stationary contact of the energized network and the now disengaged terminal on the fuseholder as it drops out and away from the stationary contact. The drawing of such an arc is undesirable for several reasons. First, the heat of the arc may damage the cutout terminals, making repairs necessary or requiring the replacement of the terminals, in addition to the fuseholder. Further, a long arc created as the fuseholder drops further away from the energized terminal may damage other nearby equipment, including the very equipment the fuse was intended to protect. Finally, the arcing creates the hazard of possible flash over around the fuse, meaning that the fuse will not be able to clear the fault. In this event, protective devices closer to the source must operate to clear the fault, possibly causing inconvenient and costly outages over portions of the network that would otherwise not have been affected if the fuse had functioned properly.

One means designed to retard premature dropout in a fuseholder is shown in Mikulecky '240. As best shown in FIG. 4 of Mikulecky, a dashpot device was employed between two members of the hinge assembly so as to oppose relative movement between these members, thereby delaying the drop open action. This feature has been successfully used for a number of years in the particular fuseholder disclosed in Mikulecky. However, not all fuseholders employ the arrangement of structural members that would accommodate the dashpot device of Mikulecky.

Accordingly, despite advances made in fuse technology over the years, further improvements would be welcomed by the industry. Specifically, there is a need for a dropout mechanism that would retain the fuseholder in its current-carrying position until after the fuse has had sufficient time to clear the fault before dropout is initiated. Ideally, the device would be simple and inexpensive to manufacture and would provide dependable operation in a variety of fuseholder application, and under widely varying ambient temperatures.

SUMMARY OF THE INVENTION

In accordance with the invention, a delay mechanism is employed in a hinge assembly for retarding the relative movement between two adjacent members. The present invention has particular application in a dropout fuseholder so as to delay or retard the dropout operation for a time sufficient to allow the fuse to completely clear the fault.

Several embodiments of the invention employ a pin member for rotatably attaching adjacent members of a hinge assembly. The shaft of the pin may be supported within a sleeve having an internal cavity filled with a viscous material, such as silicon putty. The pin is fixed to one of the two rotatable members such that movement of that member causes the pin to rotate within the sleeve. The pin includes protrusions extending from the pin shaft. The protrusions may include upsets, ridges, threads, ribs or any combination of such extending elements. The forces exerted by the putty against the shaft protrusions retard the relative rotation of the members and, when employed in a dropout fuseholder, delay dropout.

In another embodiment, a friction member, such as a washer or annular seal is disposed between the rotatable members. The frictional forces between the engaged surfaces of the friction member and the rotatable members again retard rotation of the members. The friction member may comprise a plastic washer which may include ridges or an otherwise scored or roughened facing surface, or may comprise an elastomeric member, such as an o-ring seal.

The invention may further include a fuseholder including a hinge assembly for engaging the terminal assemblies of a cutout mounting. In this embodiment, the hinge assembly includes a plug member disposed in the fusebody in a cavity having a viscous material engaging the sides of the plug member. The sides of the plug member include extending projections, such as ribs, threads, fins or upsets for interaction with the putty. A connector, such as a wire, is disposed through the plug member and extends outside the fusebody for connection with a rotatable latch which forms a part of the hinge assembly. Upon actuation of the fuse, dropout is initiated, causing the latch member to begin to rotate away from the fusebody. As this occurs, the plug member is pulled or drawn from the putty filled cavity of the fusebody. Dropout is retarded and thus delayed as the plug member is pulled through the viscous putty.

In addition, the present invention may include a hinge assembly having a dashpot assembly disposed between rotatable members of the hinge assembly. The dashpot generally includes an elastomeric boot having a spring retained in the boot, and having a viscous material filling the voids within the boot.

Thus, the present invention comprises a combination of features and advantages which enable it to substantially advance fuse and other component technology by providing a means for retarding the disconnection and dropout of such devices from energized networks. The invention provides a mechanical apparatus that will reliably retain the component in its normal current-carrying position for a predetermined period of time after dropout has been initiated, such as by the occurrence of an overcurrent of a predetermined magnitude. These and various other characteristics and advantages of the present invention will be readily apparent to those skilled in the art upon reading the following detailed description and referring to the accompanying drawings.

BRIEF DESCRIPTION OF THE DRAWINGS

For a detailed description of the preferred embodiments of the invention, reference will now be made to the accompanying drawings wherein:

FIG. 3 is a side elevational view of the lower cap and hinge assembly of the fuseholder shown in FIG. 1;

FIG. 4 is a top view of the connective member shown in FIG. 3;

FIG. 5 is a side view of the connective member shown in FIG. 4;

FIG. 6 is a top view of the hinge member shown in FIG. 3;

FIG. 7 is a side elevational view of the hinge member shown in FIG. 6;

FIG. 8 is an enlarged view of the delay mechanism of the present invention shown partly in cross section;

FIG. 9 is a side view of the latch of the lower cap and hinge assembly shown in FIG. 3;

FIG. 10 is a top view of the latch shown in FIG. 9;

FIG. 11 is a side elevational view of the latch plate member of the lower cap and hinge assembly shown in FIG. 3;

FIG. 12 is a perspective view of the current interchange of the lower cap and hinge assembly shown in FIG. 3;

DESCRIPTION OF THE PREFERRED EMBODIMENT

A variety of types of electrical equipment must be protected from potentially damaging overcurrents and overvoltages. A common type of overcurrent protection is the dropout fuseholder which protects downstream equipment from fault currents, and which thereafter drops out of engagement from its cutout mounting to provide a visual indication that the fuse has operated. The present invention provides a means to delay the fuseholder from dropping open until the fuse has had sufficient time to interrupt the flow of fault current; however, the invention is believed to have a much broader application, and will be useful for retarding the relative movement between structural members in a variety of other applications, both within the electrical arts and outside that field of endeavor. Accordingly, for purposes of example only and not by way of limiting the present invention in any way, the invention will be described with reference to its use in a current-limiting dropout fuseholder, it being understood that the invention may also be employed with expulsion type fuseholders and any of a variety of other components.

Figure 1:
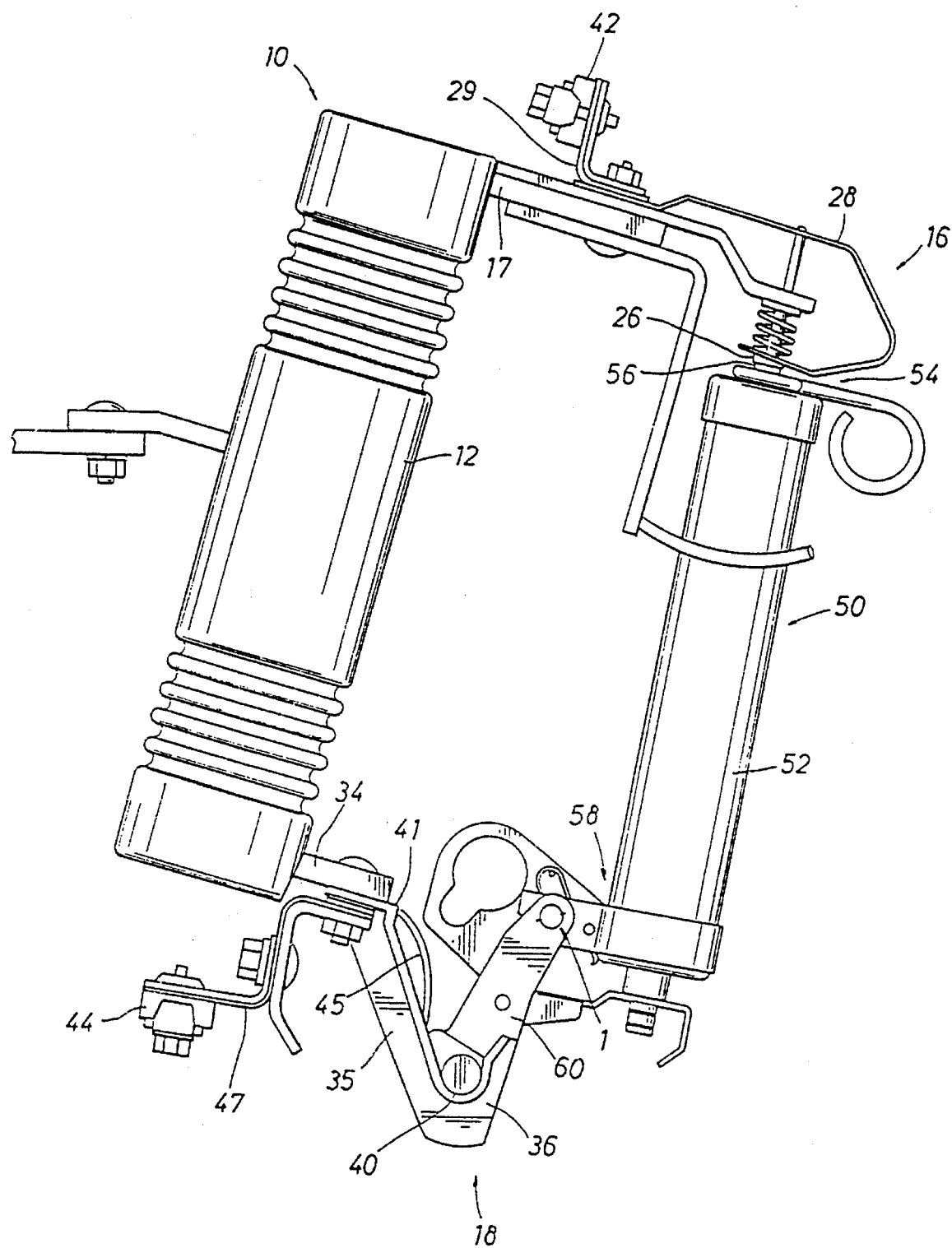
FIG. 1 is a side elevational view of a current limiting dropout fuseholder including the delay mechanism of the present invention, the fuseholder mounted in a conventional interchangeable cutout mounting.

Referring initially to FIG. 1, the delay apparatus 1 of the present invention is shown employed in current limiting dropout fuseholder 50 which is shown installed in a conventionally known interchangeable cutout mounting 10. Cutout mounting 10 generally comprises insulator 12 and upper and lower terminal assemblies 16 and 18, respectively, which are mounted on opposite ends of insulator 12 on upper and lower terminal support members 17 and 34. Upper terminal assembly 16 generally includes terminal pad 42, for receiving and clamping an electrical line conductor (not shown), conducting strap 28 and a cup contact 26 which is integrally formed in conducting strap 28. Conducting strap 28 electrically interconnects cup contact 26 and terminal pad 42 through terminal shunt 29. Lower terminal assembly 18 generally includes terminal pad 44, current shunt 47 and mounting hinge 35. Hinge 35 includes a pair of hanger arms 36 and is formed of brass or another electrically conducting material. Formed within arms 36 are U-shaped elbows 40 for supporting fuseholder 50. Attached to upper surface 41 of mounting hinge 35 are conducting spring clips 45 biased against the hinge assembly of the fuseholder 50 to insure good electrical contact. Terminal pad 44 is provided for receiving and clamping an electrical line conductor (not shown). Lower current shunt 47 provides good electrical contact between mounting hinge 35 and lower terminal pad 44.

In the preferred embodiment, fuseholder 50 comprises a full range, current limiting dropout fuseholder, similar to that described and claimed in co-pending U.S. patent application, Ser. No. 07/946,961, filed Sep. 17, 1992, the entire disclosure of which is incorporated herein by reference.

As shown in FIG. 1, fuseholder 50 generally comprises fuse body 52 having upper cap assembly 54 and lower cap and hinge assembly 58. Upper cap assembly 54 includes a top contact 56. Lower cap and hinge assembly 58 includes delay mechanism 1 and a conducting hinge member 60 which, as described below, is electrically interconnected through fuse body 52 with top contact 56. Top contact 56 is disposed within the recess of cup contact 26, and hinge member 60 is engaged by hanger arms 36 of cutout mounting 10.

Figure 2:
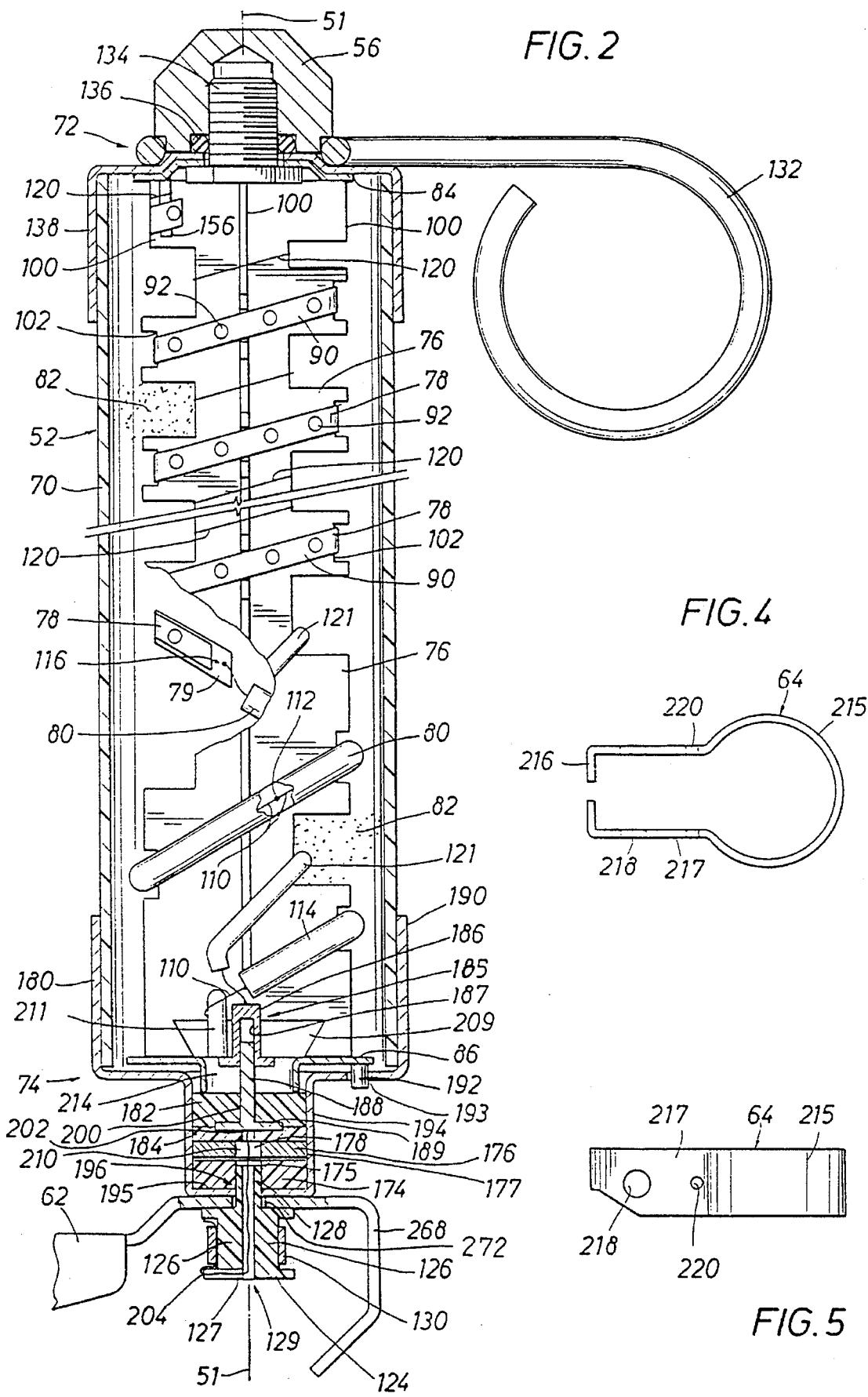
FIG. 2 is a cross-sectional view of the fusebody of the current limiting fuseholder shown in FIG. 1.

Referring now to FIG. 2, fuse body 52 includes an insulative cartridge or fuse tube 70 disposed about longitudinal fuse axis 51. A high current fusible element 78 and a low current fusible element 80 are housed in fuse tube 70 and are connected in series between upper and lower element terminations 84, 86 respectively. Fuse tube 70 is a generally tubular member which is closed at its ends by upper and lower closures 72, 74, respectively. Fuse body 52 houses an insulative supporting structure known as a spider 76 which supports fusible elements 78 and 80. High purity silica sand 82 or other materials having suitable interrupting and insulation characteristics surrounds spider 76 and fusible elements 78, 80 and fills the unused volume within fuse body 52. Spider 76 is made of an inorganic mica and it includes four arms 100 radiating from the longitudinal axis 51, three of arms 100 being visible in FIG. 2. Evenly spaced along the length of each arm 100 are element support surfaces 102.

Upper and lower element terminations 84, 86 respectively are formed of a conducting material, preferably copper, and serve as supports for arms 100 of spider 76 and as landings and termination points for fusible elements 78, 80 and for the upper end of auxiliary wire 120 as described below. Element terminations 84, 86 include angular tabs 209 for maintaining the separation between spider arms 100.

High current fusible element 78 comprises a ribbon element 90 made of silver or other electrically conducting material. Ribbon element 90 includes an array of reduced area portions 92 which comprise holes that are formed through the thickness of ribbon 90. As alternatives to holes, notches may be formed along the edges of ribbon 90, or combinations of holes and notches may be used to reduce the cross sectional area of ribbon 90. Ribbon 90, with its reduced area portions 92, is helically wound on the element support surfaces 102 of spider arms 100. The upper end of ribbon 90 is soldered to conducting tab 156 on upper element termination 84.

Referring still to FIG. 2, connected in series with high current fusible element 78 is low current fusible element 80. The series connector between fusible elements 78 and 80 is formed by copper conducting strap 79 which is supported on spider 76. Low current fusible element 80 is designed to operate at a predetermined current level below that level at which high current fusible element 78 is designed to operate. Depending on the current rating of the fuseholder 50, low current fusible element 80 is comprised of one or more parallel connected conducting wires 110 (one shown in FIG. 2), which are preferably formed of silver or other good electrically conductive material and insulated in silicone rubber coverings 114. The covered wire 110 is then helically wrapped about the lower section of spider 76. One end of wire 110 is attached to conducting strap 79 at termination point 116 by soldering. The other end of wire 110 is conductively attached to tab 211 of lower element termination 86 also by soldering.

Wire 110 of fusible element 80 is made from two approximately equal lengths of wire that are soldered together as at junction 112 with a solder having a substantially lower melting temperature than that of wire 110. The electrically conductive material used for wire 110 or the solder used at junction 112 has thermal characteristics causing it to melt at a temperature consistent with the time-current characteristic requirements of the fuse. Although junctions 112 are completely insulated by covering 114, for clarity, wire 110 is depicted in FIG. 2 with a portion of covering 114 cut away.

Also disposed within fuse body 52 is auxiliary wire 120. Preferably, auxiliary wire 120 is formed of silver for higher current rated fuses and a conductor of higher resistivity such as nichrome for lower current rated fuses. Auxiliary wire 120 is helically wound about spider 76 so as to be concentrically disposed within the helix formed by ribbon 90 and wire 110. In this fashion, auxiliary wire 120 does not contact ribbon 90 or wire 110 except, as described below, near its upper point of termination. The lower segment 121 of auxiliary wire 120 is insulated in a silicone rubber covering as it enters the space occupied by the helix formed by low current fusible element 80. The upper end of auxiliary wire 120 is soldered to tab 156 of upper element termination 84. The lower end of auxiliary wire 120 terminates on ranged receptacle 186 which is made of brass or other conducting material and retained in a central recess 185 formed along fuse axis 51 in the lower end of spider 76. A conducting insert 188, preferably made of brass, is inserted into receptacle 186 and is electrically connected to a trigger wire 204 which preferably is made of high strength and high electrical resistance nichrome. Trigger wire 204 extends outside of fuse body 52 through lower closure 74. Conducting receptacle 186, insert 188 and trigger wire 204 are all electrically insulated from lower closure 74.

Upper cap assembly 54 generally comprises top contact 56, pull ring 132, top end cap 138 and upper element termination 84, all of which are attached and their positions relative to one another maintained by the use of a single fastener, stud 134. An o-ring seal 136 is disposed about stud 134 between top contact 56 and end cap 138. Stud 134 includes a central longitudinal bore (not shown) to permit filling of fuse tube 70 with sand 82 upon assembly of fuseholder 50.

Lower closure 74 generally comprises bottom end cap 180, lower element termination 86, seal member 182, positioner 184, conductive washer 176 and insulative spacer 174. Bottom end cap 180 is formed of copper alloy or other conducting material and generally includes a cylindrical body portion 190 disposed about fuse tube 70 and a generally cylindrical reduced diameter extension 194 attached to and extending from the center of cylindrical body portion 190 thereby forming an interior recess within extension 194. Extension 194 and body 190 are generally coaxially aligned with fuse axis 51. An aperture 196 is formed substantially in the center of lower surface 195 of extension 194 at the intersection with axis 51.

Lower element termination 86 includes central aperture 214 which is substantially aligned with fuse axis 51, and further includes conducting tab 211 which serves as a landing and termination point for wire 110 of low current fusible element 80 as shown in FIG. 2. Lower element termination 86 is electrically connected to bottom end cap 180 by means of conducting tab 192. Tab 192 is formed on and extends from element termination 86 through hole 193 formed in bottom end cap 180. The portion of tab 192 extending through end cap 180 is bent over and soldered to cap 180.

Coaxially disposed within the central recess of end cap extension 194 are insulative spacer 174, conductive washer 176, wire positioner 184 and seal member 182. Seal member 182 comprises a rubber washer having central aperture 200. Wire positioner 184 comprises an insulative washer made of mica or nylon or other insulating material and includes central aperture 202. Washer 176 is preferably made of an electrically conductive material and includes a central aperture 178 and an outer edge surface 177 which engages the walls of extension 194 so as to create a current path therethrough. Insulative spacer 174, which may be made of rubber or nylon, for example, includes a central aperture 175. Trigger wire 204 is brazed or soldered to conducting insert 188. Insert 188 includes flange 189 which is disposed between seal member 182 and positioner 184. Aperture 202 of wire positioner 184 has a diameter that is smaller than the diameter of aperture 178 of conducting washer 176 so as to centrally position trigger wire 204 in aperture 178.

Receptacle 186, adapted to receive and electrically engage insert 188, is disposed through central hole 214 in lower element termination 86 and is retained in central recess 185 in the lower end of spider 76. Receptacle 186 is attached to, and in conducting engagement with, auxiliary wire 120 as previously described, but does not contact element termination 86. Conducting insert 188 is inserted into conducting receptacle 186 through hole 214 of lower element termination 86 during assembly of fuse body 52 with trigger wire 204 extending out of fuse body 52 through aperture 196 in end cap 180, passing through apertures 175, 178, 202, 200 of spacer 174, conducting washer 176, positioner 184, and seal 182, respectively. The lower segment 121 of auxiliary wire 120, receptacle 186, insert 188 and trigger wire 204 are all electrically insulated from lower cap and hinge assembly 58. A spark gap 210, which preferably is approximately 0.040 inches for all voltage and current ratings for fuseholder 50, is thus formed between trigger wire 204 and washer 176.

Lower cap and hinge assembly 58 of fuseholder 50 generally includes hinge member 60, connective member 64 and delay apparatus 1 for retarding the relative movement between hinge 60 and connective member 64. Referring now to FIGS. 3–5, connective member 64, functions like a clamp and generally includes a strap portion 215 and a pair of hinge supporting members 217 attached thereto. The ends 216 of hinge supporting members 217 are bent toward one another and formed at substantially right angles to hinge supports 217. Two pairs of aligned holes 218, 220 are formed in hinge supporting members 217. As best shown in FIG. 3, fastener 225 is disposed through aligned holes 220 in order to draw together hinge supporting members 217 and to secure and clamp strap portion 215 of connective member 64 about bottom end cap 180.

Referring to FIGS. 3, 6 and 7, hinge member 60 generally comprises base portion 232 and a pair of outwardly extending side members 234. Side members 234 include tapered edge 240, shoulder 244 and two pairs of aligned holes 236, 250. Holes 236a,b are formed through side members 234 adjacent tapered edge 240. In the preferred embodiment, hole 236a is larger in diameter than aligned hold 236b. Hole 236a receives head 326 of pin 302, described in more detail below. Shoulder portions 244 have trunions 246 extending outwardly therefrom and include cam-like electrical contact surfaces 248 adapted for electrical engagement with conducting spring clips 45 of mounting hinge 35 shown in FIGS. 1 and 3. Holes 250 are formed in side members 234 between holes 236a and shoulders 244. Base 232 extends between side members 234 and includes slot 254. Slot 254 generally bisects base 232 forming a pair of leg portions 256. Legs 256 include ends 258 which extend outwardly from base 232 at an angle which is substantially equal to 45° and form a shoulder which engages and supports one end of the current interchange 68, best shown in FIG. 3.

The delay apparatus 1 is best shown in FIG. 8 and generally comprises a hollow sleeve body 300 having interior chamber 301, a pin 302 disposed through the sleeve body, silicon putty 304 filling the voids in the sleeve chamber 301, and a pair of seals 306 to retain the putty 304 in the sleeve chamber 301.

Sleeve body 300, preferably made of 316 stainless steel, generally comprises first and second body segments 308, 310 respectively. Segments 308, 310 include a base portion 312, 313 and an extending cylindrical wall 314, 315, respectively. Base portions 312, 313 include annular collars 316, 317 respectively which are disposed through apertures 218 formed in the adjacent hinge supporting members 217 such that supporting members 217 abut shoulders 338, 339 formed on base portions 312, 313. As shown, sleeve body 300 provides a spacing means to maintain the proper separation between hinge supporting members 217. Annular collars provide a journal bearing means for pin 302.

Annular collars 316, 317 each include a coaxially aligned central bore 318 for receiving pin 302. Cylindrical wall 314 of first body segment 308 includes an extension 320 having a reduced outer diameter relative to cylindrical wall 314. Cylindrical wall 315 of second body segment 310 includes a counterbore 322 for receiving the end of extension 320. Counterbore 322 does not extend deeply enough into the cylindrical wall 315 of second body segment 310 to receive the entire length of extension 320 such that a circumferential groove or recess 324 is formed in the outer surface of sleeve body 300 when extension 320 is received within counterbore 322. Latch plate 66 is disposed about sleeve body 300 in recess 324. With first body segment 308 received in second body segment 310, central chamber 301 is formed within sleeve body 300.

Pin 302 generally includes a head 326 connected to a pin shaft 328. Pin shaft 328 includes a first shaft segment 330 and a second shaft segment 332, the second segment 332 having a reduced diameter relative to the first segment 330. Formed on second shaft segment 332 are upset portions 334 extending from the surface 333 to a length equal to or less than the diameter of the first pin shaft segment 330.

Pin shaft 328 is disposed through sleeve body 300 with the second shaft segment 332 received through bore 318 and collar 316 of first body segment 308 and with the first shaft segment 330 received in the bore 318 and the collar 317 of second body segment 310. Filling the voids between pin shaft 328 and the cylindrical walls 314, 315 of first and second body segments 308, 310 is silicon putty 304. Silicon putty 304 is the preferred material for use in sleeve body 300 due to its high viscosity, which provides the desired resistance to rotation of shaft 328. Additionally, silicon putty 304 will maintain its viscosity and other physical characteristics over a wide range of temperatures. Seals 306 retain the putty within the sleeve chamber 301 and are disposed about pin shaft 328 adjacent to the base 312, 313 of first and second body segments 308, 310. Pin head 326 is disposed within side member 234 of hinge 60 and is fixed thereto by splines 336 which are press fit into keyways formed in head 326 and sidemember 234 of hinge 60. In this manner, the rotation of hinge 60 will also cause rotation of pin shaft 328 relative to sleeve body 300.

Referring now to FIGS. 3, 9 and 10, latch 62 generally comprises base 260, side members 262, and fuse retaining end 268. Side members 262 are attached to, and extend substantially perpendicularly from, base 260. Side members 262 include ears 264 having aligned holes 266 formed therein. Pin 252 (FIG. 3) is disposed through aligned holes 266 such that latch 62 is rotatably mounted about pin 252. Spring 63 is also mounted around pin 252 between side members 262 to bias latch 62 to rotate about pin 252 in a clockwise direction as viewed in FIG. 3. Base 260 of latch 62 includes latching surface 267 extending between sides 262 for engaging latch plate 66 as described in more detail below. A notch 269 is formed in latching surface 267 for receiving spring arm 65 of spring 63, best shown in FIG. 3. The free end of latch 62 comprises fuse retaining end 268 which includes elongate aperture 272. Latch 62 is preferably made of stainless steel, although any conductive or insulative material having sufficient rigidity and strength may be employed.

Referring again to FIGS. 2 and 3, fuseholder 50 further includes a plug-like bobbin 124. Bobbin 124 is made of nylon or other insulative material and generally comprises a spool-shaped body 126 and an annular extension 128 attached to body 126. A central aperture 129 is formed through body 126 and extension 128. Upon assembly of fuseholder 50, fuse retaining end 268 of latch 62 is rotated into its latched or supporting position against extension 194 of bottom end cap 180. Aperture 272 in retaining end 268 of latch 62 is in the form of a slot to allow the annular extension 128 of bobbin 124 to properly align with fuse axis 51.

Annular extension 128 of bobbin 124 is disposed through aperture 272 in latch 62 and the end of trigger wire 204 extending from fuseholder 52 is disposed through central bore 129 of bobbin 124. Trigger wire 204 is then bent and pressed into a radially formed groove 127 in lower surface of spool body 126 and held in place against the sides of body 126 by clamping band 130. When so attached, the latch 62 and trigger wire 204 retain hinge member 60 and connective member 64 in fixed angular relationship to one another in a "contracted" and "charged" position, and prevent rotation about the joint means, i.e. pin 302 and sleeve body 300.

Now with reference to FIGS. 3, 8 and 11, latch plate 66 is a generally flat metal plate having a projecting latch surface 276 for engaging latching surface 267 of latch 62 (FIG. 10). Latch plate 66 further includes a notch 278 for receiving fastener 225 of connective member 64, a key way 280 for use in installing and removing fuseholder 50 by "hot stick," and an aperture 284 for receiving pin 290 shown in FIG. 3. Latch plate 66 further includes aperture 282 for receiving sleeve body 300 as best shown in FIG. 8. Latch plate 66 is received in slot 254 of hinge member 60 (FIG. 6) and includes a stop shoulder 227 for limiting its rotation on pin 302 through engagement with pin 252 (FIG. 3). The rotatable mounting of connective member 64 and latch plate 66 about sleeve body 300, together with the inter-engagement of the fastener 225 within the notch 278 cause latch plate 66 to be non-rotatably anchored to connective member 64. This connection means causes latch plate 66 and connective member 64 to always rotate as a single unit along with fuse body 52 about the joint means, i.e. pin 302 and sleeve body 300.

Current interchange 68 is best shown in FIGS. 3 and 12. As shown, pin 290 is disposed through aperture 284 of latch plate 66 and provides support for current interchange 68. Current interchange 68 is preferably formed of phosphor bronze, a good electrical conducting material that is also suitable for use as a spring. Current interchange 68 includes a pair of U-shaped legs 292, 293 separated by slot 294 and connected by segment 296. Current interchange 68 comprises a means for conducting current between bottom end cap 180 of fuse body 52 and hinge member 60. Legs 292, 293 straddle latch plate 66, and are supported on pin 290 which projects from latch plate 66. Connecting segment 296 electrically engages bottom end cap 180 while ends 298 of legs 292, 293 electrically engage the ends 258 of legs 256 of hinge member 60. When engaged between fuse body 52 and hinge 60, current interchange 68 acts as a spring and imparts approximately 12 inch-pounds of torque between hinge 60 and fuse body 52 which assists hinge member 60 to rotate to its extended position to allow fuseholder 50 to drop out of engagement with cutout mounting 10.

Fuseholder 50 is shown in FIGS. 1 and 3 with hinge member 60 and connective member 64 in their contracted and charged position, and with latch 62 and latch plate 66 latched. So latched, fuseholder 50 is in its extended position, and current is conducted from upper terminal 16 of cutout mounting 10 through fuseholder 50 to lower terminal assembly 18 by means of bottom end cap 180, current interchange 68, hinge member 60 and conducting spring clips 45 to mounting hinge 35 of lower terminal assembly 18.

Referring to FIGS. 1–3, 8, when current limiting fuseholder 50 experiences an overcurrent of a predetermined magnitude and duration, fusible element 78 or 80 will fuse open. For an instant after this occurs, the overcurrent is conducted through fuseholder 50 to bottom end cap 180 via auxiliary wire 120, trigger wire 204, spark gap 210 and conducting washer 176. Trigger wire 204 has a high resistance, and the high $I^2R$ heating, coupled with the heat generated by the arc across gap 210 will sever trigger wire 204, thereby acting as a release means for releasing and freeing latch 62 from retainment by trigger wire 204 and bobbin 124. When this occurs, fuse restraining end 268 of latch 62, no longer held in contact with bottom end cap 180, is biased away from its supporting position beneath end cap 180 of fuse body. The weight of fuseholder 50 and the forces imparted thereon by top terminal assembly 16 and conducting spring clips 45 of interchangeable cutout mounting 10 and the spring force from current interchange 68 will tend to cause the lower cap and hinge assembly 58 to begin to collapse about pin 302 and will tend to bias hinge member 60 and connective member 64 away from one another and toward the extended position. Rotation of hinge 60 will cause rotation of pin shaft 328; however, such rotation will be retarded by the torsional forces created by the silicon putty 304 and the upset pieces 334 on pin shaft 328. By so retarding the relative movement between hinge member 60 and connective member 64, the fuse is permitted sufficient time to complete the interruption of the fault current. After the fuse has cleared the fault and after hinge member 60 and connective member 64 have rotated about pin 302 to their extended position, upper cap assembly 54 of fuse body 52 will drop out of engagement with top terminal assembly 16 of cutout mounting 10. With upper cap assembly 54 no longer restrained, fuseholder 50 will then rotate on trunions 246, still engaging hanger arms 36 of interchangeable cutout 10, until fuseholder 50 ultimately reaches its lowermost position to provide a clear and highly visible indication to utility personnel that the fuse has operated.

The use of auxiliary wire 120, a series-connected trigger wire 204 and a series spark gap 210 as an alternate current path through fuseholder 50 has been proven to be a successful means for causing the fuseholder to drop out of engagement with its mounting 10 upon actuation of either the high or low current fusible elements 78, 80. To ensure successful drop out operation of the fuseholder 50, it is important that auxiliary wire 120 not melt and force the fault current to transfer back to the path of fusible elements 78, 80 too quickly, but instead remain conducting long enough for the arcing across gap 210 to completely sever trigger wire 204. On the other hand, the dropout function is of secondary importance to the ability of fuseholder 50 to interrupt the flow of fault current and to do so before the dropout action of fuseholder 50 causes any significant separation between the upper contact assembly 54 of fuseholder 50 and the cup contact 26 of cutout mounting 10. Increasing the melt time of the auxiliary wire 120 by either increasing the cross-sectional are of the wire or by using a material of lower resistivity will increase the assurance that arcing at gap 210 will completely sever trigger wire 204 in the process of operation at any level of fault current.

For example, increasing the auxiliary wire diameter in a 6 amp rated fuse from 0.0063" nichrome to 0.008" nichrome will assure sufficient arcing to completely sever trigger wire 204. However, the larger wire may preclude successful fault current interruptions at some current levels. For example, the 6 amp rated fuse may be required to interrupt a current as low as 6 amps. After melting and burnback of the low current element 80, the 6 amp current will be transferred to auxiliary wire 120 and across arc gap 210 to trigger wire 204. Trigger wire 204 will be completely severed within two 60 Hz cycles (0.033 seconds) of the 6 amp arcing current, and the dropout action of fuseholder 50 will then begin. A 0.0063 inch diameter nichrome auxiliary wire 120 will melt in 0.035 seconds when carrying a 6 amp current, or very shortly after trigger wire 204 would be severed. On the other hand, a 0.008 inch diameter nichrome wire would carry this same 6 amp current for 0.35 seconds before melting, allowing for significant separation between the upper terminal assembly 16 of cutout mounting 10 and the upper contact 56 of fuseholder 50 before the complete interruption of the 6 amp current by fuseholder 50. As a further comparison, a 0.0078 inch diameter silver auxiliary wire 120 will require a full second to melt when carrying the same 6 amp current. As the upper contact assembly on the fuseholder drops away from engagement with the upper terminal assembly 16 of the cutout mounting 10, an arc is formed therebetween. As the fuseholder 50 continues to drop open and the upper contact 56 begins to rotate even further away from the upper terminal assembly 16, the length of the arc may grow. During this process, the arc may flash over the whole cutout mounting 10 or flash over to some other nearby grounded structure or equipment. If this were to occur, the fuseholder 50 may not operate to isolate the faulted line or equipment, causing other upstream protected devices to operate which may disconnect from service a substantial portion of an electrical distribution network.

Thus, the delay apparatus 1 of the present invention ensures that auxiliary wire 120 will have time to completely extinguish the flow of fault current before the top contact 56 drops out of engagement with the upper terminal assembly 16 of cutout mounting 10, and thereby eliminates the problems and hazards associated with arcing during dropout. Regardless of the magnitude of fault current through fuseholder 50, and regardless of the time it takes to sever trigger wire 204 and auxiliary wire 120 to melt and interrupt the current, delay apparatus 1 retains connective member 64 and hinge member 60 in their charged and contracted positions for a time sufficient for auxiliary wire 120 to melt and clear the fault current.

FIGS. 13–25 depict a number of alternative embodiments of the present invention and include alternative means for delaying or retarding dropout of fuseholder 50 for a length of time sufficient to allow auxiliary wire 120 to extinguish the fault. These alternative embodiments employ many elements which are identical to those previously shown and described. Accordingly, where like elements are shown and described with reference to FIGS. 13–25, the same reference numeral may be used.

Figure 13:
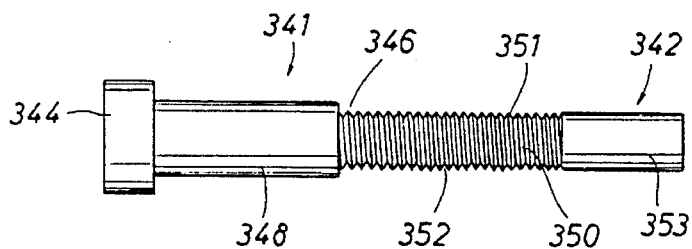
FIGS. 13–15 show alternative embodiments of a pin member which may be employed in the sleeve body of the delay mechanism of FIG. 8.

Referring now to FIG. 13, there is shown an alternative embodiment of the present invention including delay apparatus 341. Delay apparatus 341 includes pin member 342. Pin 342 includes head 344 and shaft 346 which is divided into first shaft segment 348 and second shaft segment 350. A length of second shaft segment 350 is threaded in a conventional manner on surface 352, however end 353 of shaft segment 350 is unthreaded so as to form a sealing surface for seal 306 (shown in FIG. 8). Pin 342 is disposed in sleeve body 300 and silicon putty 304 fills all voids around shaft segment 350 as previously described with respect to FIG. 8. The raised threads 351 on pin 342 shown in FIG. 13 acting against putty 304 will have the same effect in retarding rotation of pin member 342 as upsets 334 shown in FIG. 8.

Figure 14:
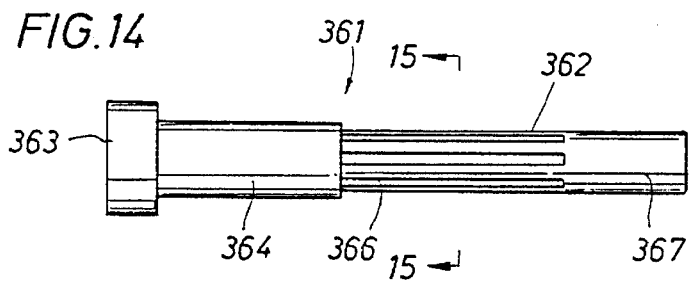
Figure 15:
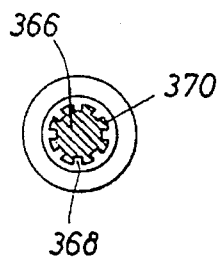

Another alternative embodiment is shown in FIGS. 14 and 15. As shown therein delay apparatus 361 comprises pin member 362. Pin 362 includes head 363, first shaft segment 364 and second shaft segment 366. A first length of shaft segment 366 includes longitudinal grooves 368 formed in surface 369 so as to form longitudinally oriented and radially projecting fins 370. End 367 of shaft segment 366 is not grooved so as to form a sealing surface for seal 306 (shown in FIG. 8). Pin 362 is disposed in sleeve body 300 as previously described with reference to FIG. 8. Rotation of pin 362 is retarded by the interaction of fins 370 and putty 304 in sleeve body 300. By retarding the rotation of pin 362 in sleeve body 300, the collapse of hinge member 60 and connective member 64 after trigger wire 204 has been severed is delayed for a period of time sufficient for auxiliary wire 120 to melt and complete the interruption of low level currents.

Figure 16:
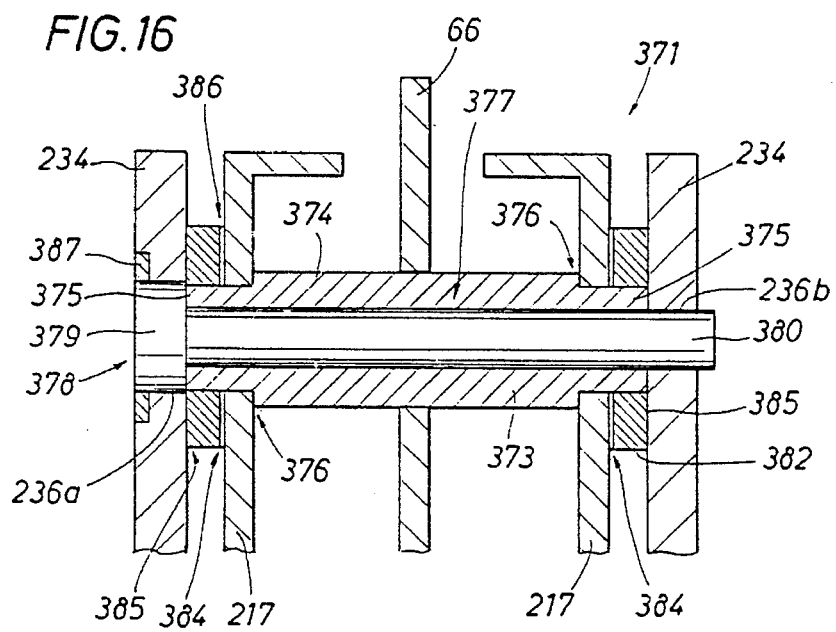
FIG. 16 is an enlarged view, partly in cross-section, of an alternative embodiment of the delay apparatus of the present invention.
Figure 17:
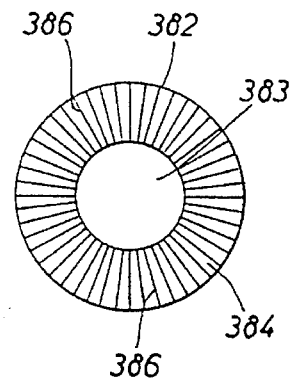
FIG. 17 is an elevational view of the friction washer shown in FIG. 16.

Another alternative embodiment of the invention is shown in FIGS. 16–17. Referring first to FIG. 16, there is shown a delay apparatus 371 generally comprising sleeve 373, pin member 378, and friction washer 382. Sleeve 373 is preferably made of stainless steel and includes a central body portion 374 and reduced diameter end portions 375 which join body portion 374 at shoulders 376. Sleeve 373 further includes an axial bore 377 formed through body portion 374 and ends 375.

Figure 18:
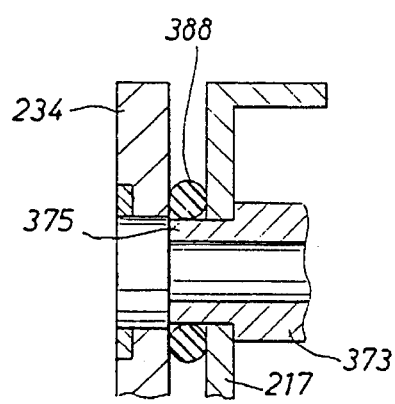
FIG. 18 is an enlarged view shown partly in cross-section of another alternative embodiment of the present invention.

Friction washer 382 is preferably made of plastic such as Delrin or Celcon. Washer 382 includes a central aperture 383 and inner and outer facing surfaces 384, 385, respectively. Facing surfaces 384 or 385, or both, include scoring or ridges 386. For purposes of illustration, inner facing surfaces 384 are shown with ridges 386 in FIGS. 16–17. As an alternative, rubber o-rings 388 may be disposed about ends 375 of sleeve 373 instead of friction washers 382 as shown in FIG. 18.

Upon assembly of the delay apparatus 371 of FIG. 16, sleeve 373 is disposed through latch plate 66 with end portions 375 disposed through apertures 218 in hinge supports 217 of connective member 64. Friction washers 382 are disposed about ends 375 with their inner facing surfaces 384 contacting hinge supports 217 of connective member 64. Pin member 378 is disposed through apertures 236 of hinge 60, apertures 383 of friction washers 382 and through bore 377 of sleeve 373. Head 379 of pin 378 is keyed to side member 234 of hinge 60 by splines 387. As shown in FIG. 16, outer facing surfaces 385 of friction washer 382 bear against side members 234 of hinge 60.

Upon actuation of fuseholder 50, trigger wire 204 will be severed, thereby releasing latch 62 and allowing hinge 60 and connective member 64 to begin to rotate as previously described with reference to FIGS. 1–3. Referring again to FIG. 16, the frictional forces between friction washers 382 and hinge supports 217 of connective member 64 and between friction washers 382 and side members 234 of hinge member 60 retard or delay the rotation of connective member 64 relative to hinge member 60, thereby delaying dropout of fuseholder 50 for a period of time sufficient to allow auxiliary wire 120 to clear the fault.

Figure 19:
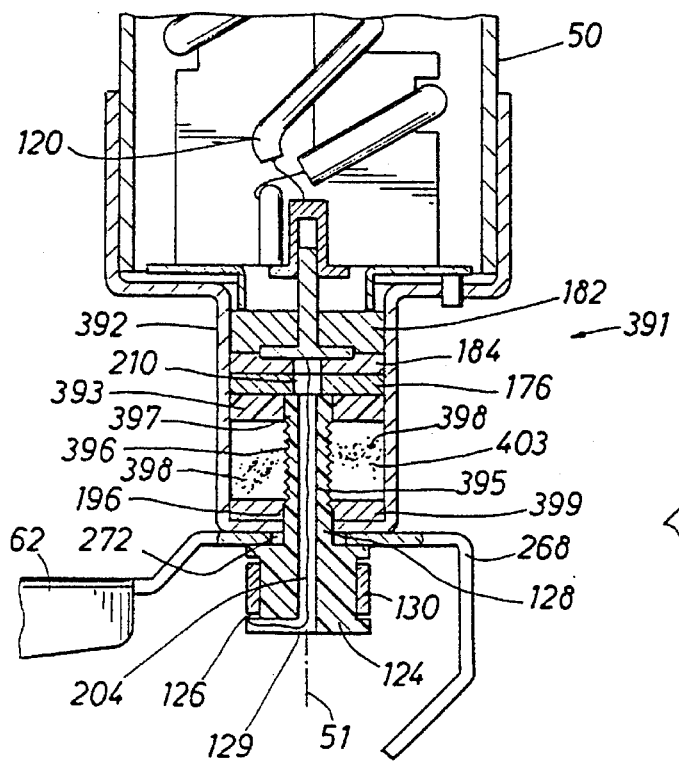
FIG. 19 is a cross-sectional view of another alternative embodiment of the present invention.

Another alternative embodiment of the invention is shown in FIG. 19. As shown, delay apparatus 391 generally comprises end cap extension 392, intermediate seal 393, lower seal 399, bobbin 124 and silicon putty filler 398. End cap extension 392 retains seal member 182, wire positioner 184, and conductive washer 176 in a stacked relationship, all as previously described with reference to FIG. 2. Also as previously described, spark gap 210 is formed between trigger wire 204 and conductive washer 176. Intermediate seal 393 is disposed within end cap extension 392 beneath conductive washer 176, and lower seal 399 is disposed at the bottom of end cap extension 392. Seals members 393 and 399, which may be made of rubber, include central apertures aligned with fuse axis 51.

Bobbin 124 comprises a plug member and includes a spool-shaped body 126, a first annular extension 128 and second annular extension 395 extending from first annular extension 128. First annular extension 128 is disposed through the central aperture of seal member 399. A central bore 129 is formed through body 126 and extensions 128, 395. As previously described with reference to FIG. 2, upon assembly of fuseholder 50, fuse retaining end 268 of latch 62 is rotated and latched by latch plate 66 in position against extension 392 of end cap 180 with annular extensions 128, 395 disposed through elongate aperture 272 in latch 62. Trigger wire 204 is disposed through central bore 129 of bobbin 124 and is fastened to bobbin 124 by clamping band 130.

Second annular extension 395 of bobbin 124 includes end portion 397 and a plurality of protrusions formed between end portion 397 and first annular extension 128. In the preferred embodiment, the protrusions comprise circumferential ribs 396. End 397 is disposed within the aperture of seal 393. Silicon putty 398 or other highly viscous and temperature insensitive material fills the annular chamber 403 defined by annular extension 395 and end cap extension 392. Seal members 393, 399 sealingly engage first and second annular extensions 128, 395 of bobbin 124 so as to retain putty 398 within chamber 403 and prevent putty 398 from filling spark gap 210.

Upon actuation of fuseholder 50, the overcurrent will be transferred to the conductive path comprising trigger wire 204 and spark gap 210 as previously described with reference to FIG. 2. When trigger wire 210 is severed by the heat from the resulting arcing across gap 210, fuse retaining end 268 of latch 62 will be biased to rotate in a clockwise direction as viewed in FIG. 19. Due to the interconnection of trigger wire 204 to plug-like bobbin 124 and the interconnection of bobbin 124 to latch 62, the rotation of latch 62 will tend to pull second annular extension 395 through silicon putty 398 and pull bobbin 124 out of end cap extension 392 through the central aperture in seal 399 and the aligned aperture 196 formed in end cap extension 392. The interaction of silicon putty 398 with ribs 396, however, will impede and retard the withdrawal of plug-like bobbin 124, thereby delaying the rotation of latch 62 away from its latched and supporting position shown in FIG. 19, and delaying dropout of fuseholder 50 for a time sufficient to allow auxiliary wire 120 to completely extinguish the flow of fault current.

Figure 21:
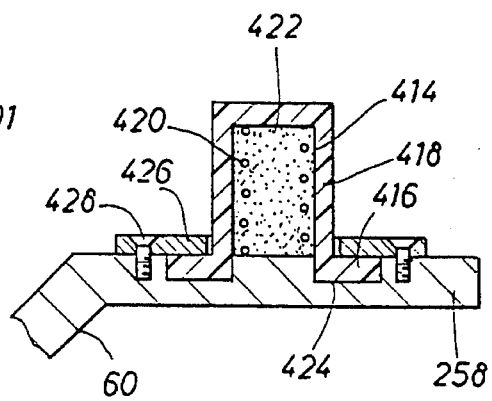
FIG. 21 is a cross-sectional view of the dashpot shown in FIG. 20.
Figure 20:
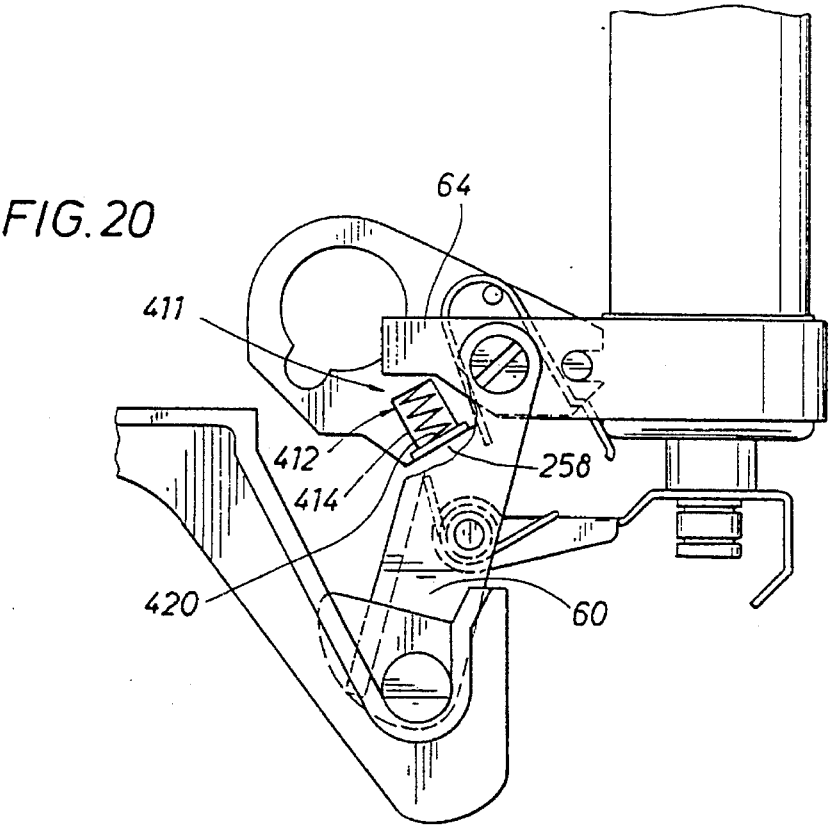
FIG. 20 is a side elevational view of the lower cap and hinge assembly of fuseholder employing another alternative embodiment of the delay apparatus of the present invention.

FIGS. 20-24 show other alternative embodiments of the invention. Referring first to FIGS. 20 and 21, there is shown an alternative delay apparatus 411 comprising a dashpot 412 disposed between connective member 64 and hinge member 60 for delaying the drop open movement of fuseholder 50 sufficiently to permit fault clearing under predictable operating situations. Dashpot 412, best shown in FIG. 21, includes an outer boot 414 of silicone rubber. Boot 414 includes flange 416 and cylindrical extension 418. A coil spring 418 is positioned within extension 418. The remainder of the boot interior is filled with a silicon putty 412 to eliminate all air spaces. The silicon putty is a highly viscous material and, in combination with the spring and rubber boot, will oppose the relative movement between connective member 64 and hinge member 60 of the lower cap and hinge assembly 58 to delay the drop open operation. Silicon putty is the preferred material for use in the boot as it offers resistance to compression and maintains its physical characteristics over a wide temperature range. Flange 416 is seated in recess 424 which is cast or otherwise machined in ends 258 of hinge legs 256 (FIG. 6). Plates 426 and screws 428 fasten boot 414 to hinge 60. The dashpot 412 is positioned such that the compression forces act generally axially on the boot 414. This arrangement is employed to prevent the boot 414 from kinking or bending during operation.

Figure 22:
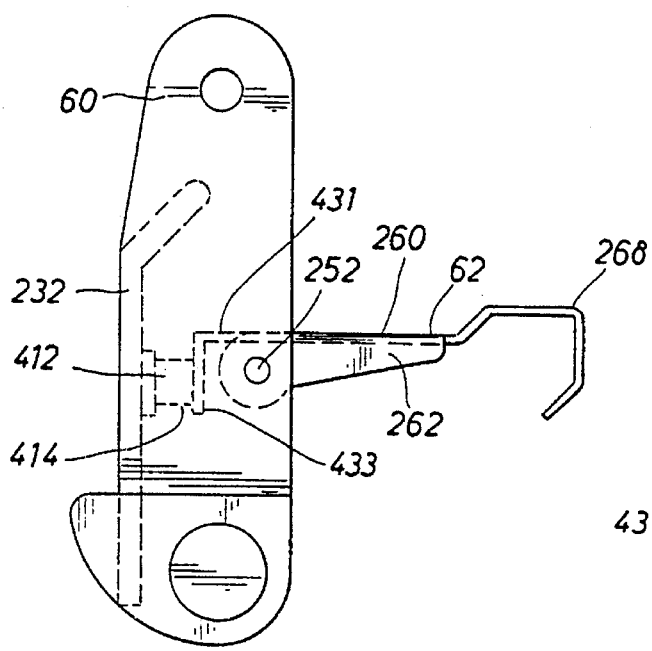
FIG. 22 is a side elevational view of a portion of the lower cap and hinge assembly and delay mechanism of a fuseholder employing still another embodiment of the present invention.
Figure 23:
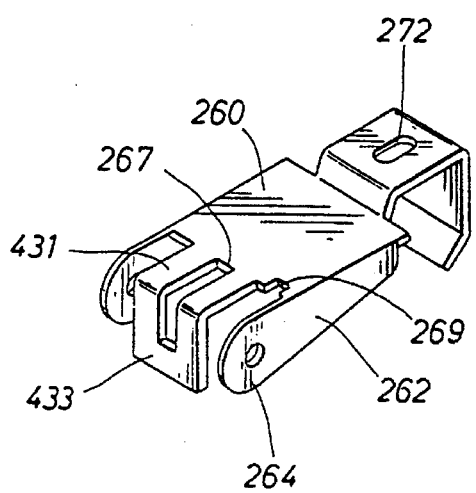
FIG. 23 is a perspective view of the latch of the hinge assembly of FIG. 22.

Alternatively, as shown in FIGS. 22 and 23, the dashpot 412 may be placed between base 232 of hinge member 60 and latch 62 to retard and thereby delay rotation of latch 62 from its latched or supporting position shown in FIG. 22. In this embodiment, latch 62 comprises base 260, previously described with reference to FIGS. 9 and 10, and an integrally formed latch extension 431 extending from latch surface 267 of base 260. Latch 62 is rotatably connected to hinge member 60 by pin 252. Dash pot 412 is mounted on base 232 of hinge member 60. Latch extension 431 includes engaging portion 433 which is positioned adjacent to boot 414 when latch 62 is pinned to hinge member 60 and latched by latch plate 66. So positioned, the rotation of latch 62 about pin 252 upon actuation of fuseholder 50 is retarded, and dropout of fuseholder 50 is thus delayed, by the forces exerted on engaging portion 433 of latch extension 431 by dashpot 412.

Figure 24:
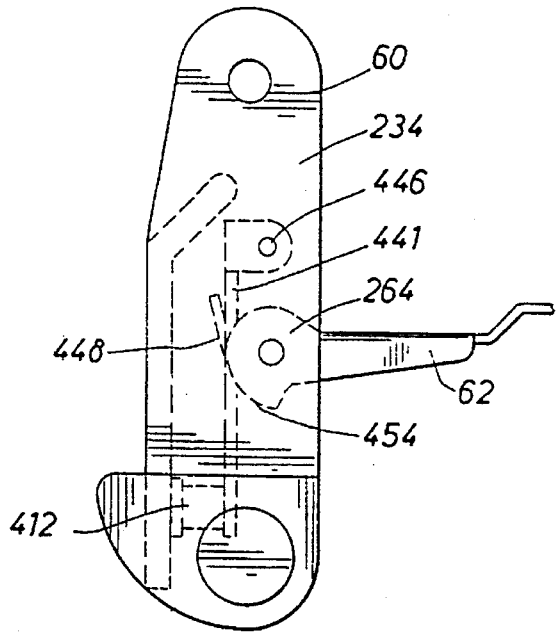
FIG. 24 is a side elevational view of a portion of the lower cap and hinge assembly of a fuseholder employing another embodiment of the present invention.
Figure 25:
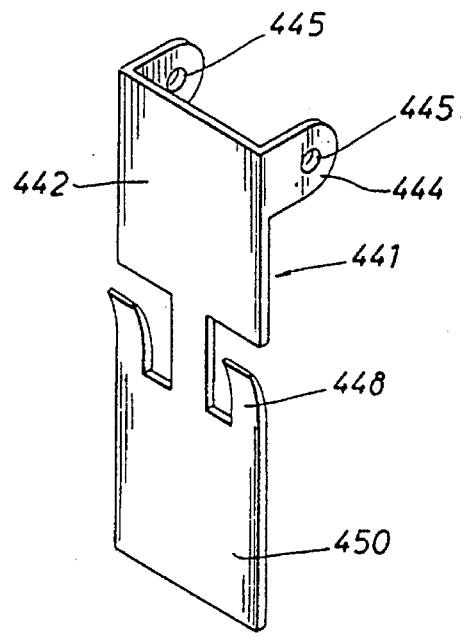
FIG. 25 is a perspective view of the pivot arm of the lower cap and hinge assembly shown in FIG. 24.

As a further alternative, the dashpot 412 may be positioned between the hinge member 60 and pivot arm 441 as shown in FIGS. 24-25. Pivot arm 441 generally includes body 442 having tabs 444, camming extensions 448 and engaging end 450 for engaging boot 414 of dashpot 412. Pivot arm is preferably made of stainless steel. Tabs 444 include aligned holes 445. Pivot arm 441 is rotatably connected to side members 234 of hinge member 60 by pin 446 which is disposed through holes 445 and aligned holes formed in side member 234. In this embodiment, latch 62 includes camming surfaces 454 formed on ears 264. As best shown in FIG. 24, camming surfaces 454 engage camming extensions 448 on pivot arm 441. Upon actuation of the fuseholder 50, latch 62 is released and begins to rotate about pin 252 in a clockwise direction as viewed in FIG. 24. As this occurs, the camming surfaces 454 of latch ears 264 engage camming extensions 448, causing engaging end 450 of pivot arm 441 to compress dashpot 412. As described above, dashpot 412 tends to initially resist the movement of pivot arm 441 and thus latch 62, thereby retarding drop open action of the fuseholder 50.

While the preferred embodiments of the invention have been shown and described, modifications thereof can be made by one skilled in the art without departing from the spirit and teachings of the invention. The embodiments described herein are exemplary only, and are not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. An apparatus for retarding rotation of a pin member, comprising:

a sleeve having a body and a chamber within said body, said sleeve body comprising first and second coaxial body segments, said first body segment including a reduced-diameter portion and said second body segment including a counterbore sized to receive said reduced-diameter portion, said reduced diameter portion being axially longer than said counterbore, such that a circumferential recess is formed when said reduced diameter portion is slidingly received in said counterbore;

a pair of aligned apertures in said body;

a shaft disposed through said apertures and adapted for rotation within said chamber;

viscous material surrounding said shaft and substantially filling the voids in said chamber; and extensions on said shaft for engaging said viscous material and retarding rotation of said shaft in said chamber.

2. The apparatus of claim 1 wherein said extensions comprise a plurality of upsets formed on said shaft.

3. The apparatus of claim 1 wherein said extensions comprise threads formed on said shaft.

4. The apparatus of claim 1 wherein said extensions comprise fins formed longitudinally along said shaft.

5. The apparatus of claim 1 wherein said viscous material comprises silicon putty.

6. A hinge assembly comprising:
- a pair of spaced-apart shaft-supporting members, each of said members having an aperture formed therethrough and aligned with an axis of rotation;
- a pair of spaced-apart sleeve-supporting members disposed between said shaft-supporting members, each of said sleeve-supporting members having an aperture formed therethrough and aligned with said axis of rotation;
- a sleeve member disposed between said sleeve-supporting members, said sleeve member comprising:
  - a body;
  - a cavity within said body; and
  - a pair of apertures in said body, said apertures aligned with said axis;
- a pin member having a shaft disposed through said aligned apertures of said shaft-supporting members and said sleeve-supporting members and through said apertures of said sleeve body, said shaft and sleeve body defining an annular void therebetween; and
- a viscous material in said cavity substantially filling said annular void.

7. The hinge assembly of claim 6 further comprising extensions on said shaft for engaging said viscous material and retarding rotation of said shaft in said cavity.

8. The hinge assembly of claim 7 wherein said sleeve includes annular collars extending from said body, said collars disposed through said aligned apertures in said sleeve-supporting members and forming journal bearings for supporting said pin member.

9. The hinge assembly of claim 8 wherein said sleeve body comprises a first and second body segment, and wherein said sleeve cavity is formed by the interengagement of said first and second body segments.

10. The hinge assembly of claim 9 wherein said pin member includes a head portion and wherein said head portion is attached to one of said spaced-apart shaft supporting members such that rotation of said pin member relative to said shaft-supporting member is prevented.

\* \* \* \* \*